(12) United States Patent
Branch

(10) Patent No.: US 9,587,998 B2
(45) Date of Patent: Mar. 7, 2017

(54) IMPACT INDICATOR

(71) Applicant: ShockWatch, Inc., Dallas, TX (US)

(72) Inventor: Clinton A. Branch, Jacksboro, TX (US)

(73) Assignee: ShockWatch, Inc., Dallas, TX (US)

(*) Notice: Subject to any disclaimer, the term of this patent is extended or adjusted under 35 U.S.C. 154(b) by 0 days.

(21) Appl. No.: 14/832,746

(22) Filed: Aug. 21, 2015

(65) Prior Publication Data

US 2015/0355041 A1    Dec. 10, 2015

Related U.S. Application Data

(63) Continuation of application No. 13/483,961, filed on May 30, 2012, now Pat. No. 9,116,058.

(60) Provisional application No. 61/495,400, filed on Jun. 10, 2011, provisional application No. 61/522,562, filed on Aug. 11, 2011.

(51) Int. Cl.
*G01L 5/00* (2006.01)
*G01P 15/03* (2006.01)

(52) U.S. Cl.
CPC .......... *G01L 5/0052* (2013.01); *G01P 15/036* (2013.01); *G01P 15/038* (2013.01)

(58) Field of Classification Search
CPC .......... G01L 5/00; G01L 5/0052; G01P 15/00; G01P 15/02; G01P 15/03; G01P 15/032; G01P 15/038; G01P 15/04; G01P 15/06; B65D 79/02
USPC ............................. 116/200, 203; 73/492, 509
See application file for complete search history.

(56) References Cited

U.S. PATENT DOCUMENTS

| | | | |
|---|---|---|---|
| 2,825,297 | A | 3/1958 | Harrison |
| 2,976,732 | A | 3/1961 | Hautly |
| 3,021,813 | A | 2/1962 | Rips |
| 3,312,188 | A | 4/1967 | Lode et al. |
| 3,373,716 | A | 3/1968 | Williams |
| 3,425,388 | A | 2/1969 | West |
| 3,461,730 | A | 8/1969 | Peters |
| 3,623,449 | A | 11/1971 | Knutson |
| 3,707,722 | A | 12/1972 | Itoh |
| 3,782,204 | A | 1/1974 | Boardman |

(Continued)

FOREIGN PATENT DOCUMENTS

JP    2006300768    11/2006

OTHER PUBLICATIONS

International Search Report and Written Opinion; PCT Application No. PCT/US2012/040011; Dec. 26, 2012.

(Continued)

*Primary Examiner* — R. A. Smith
(74) *Attorney, Agent, or Firm* — James L. Baudino

(57) ABSTRACT

An impact indicator includes a first member having a reservoir for holding an indicator fluid; a second member couplable to the first member; and a third member disposed between an opening of the reservoir and the second member. Responsive to receiving a predetermined level of impact, at least a portion of the indicator fluid exits the reservoir, and wherein the third member causes the portion of the indicator fluid to be distributed across a surface of the first member adjacent the opening and facing the third member, the portion of the indicator fluid located on the surface of the first member providing a visual indication of the received predetermined level of impact.

17 Claims, 10 Drawing Sheets

(56) References Cited

U.S. PATENT DOCUMENTS

| | | |
|---|---|---|
| 3,909,568 A | 9/1975 | Greenhug |
| 4,068,613 A | 1/1978 | Rubey |
| 4,125,085 A | 11/1978 | Rubey |
| 4,177,751 A | 12/1979 | Rubey |
| 4,219,708 A | 8/1980 | Rubey |
| 4,237,736 A | 12/1980 | Wright |
| 4,239,014 A | 12/1980 | Rubey |
| 4,361,106 A | 11/1982 | Eklof |
| 4,528,851 A | 7/1985 | Ozols |
| 4,688,244 A | 8/1987 | Hannon et al. |
| 4,982,684 A | 1/1991 | Rubey |
| 5,027,105 A | 6/1991 | Dailey et al. |
| 5,040,313 A * | 8/1991 | Simjian et al. .......... A43B 3/00 36/114 |
| 5,051,725 A | 9/1991 | Caccitolo |
| 5,153,561 A | 10/1992 | Johnson |
| 5,323,729 A | 6/1994 | Rubey |
| 5,347,274 A | 9/1994 | Hassett |
| 5,351,539 A | 10/1994 | Ziegenbein et al. |
| 6,272,901 B1 | 8/2001 | Takeuchi et al. |
| 6,301,718 B1 | 10/2001 | Rigal |
| 6,314,907 B1 | 11/2001 | Harris et al. |
| 6,367,408 B1 | 4/2002 | Gu |
| 6,685,094 B2 | 2/2004 | Cameron |
| 6,698,272 B1 | 3/2004 | Almirante |
| 6,848,389 B1 | 2/2005 | Elsasser et al. |
| 7,119,759 B2 | 10/2006 | Zehner et al. |
| 7,219,619 B2 | 5/2007 | Fitzer et al. |
| 7,353,615 B1 | 4/2008 | Branch |
| 7,509,835 B2 | 3/2009 | Beck |
| 7,918,179 B2 | 4/2011 | Pan et al. |
| 8,074,489 B2 | 12/2011 | Ishikawa et al. |
| 8,234,994 B1 | 8/2012 | Branch |
| 8,387,552 B2 | 3/2013 | Branch |
| 8,646,401 B2 | 2/2014 | Branch |
| 8,863,683 B2 | 10/2014 | Branch et al. |
| 2005/0039669 A1 | 2/2005 | Elsasser et al. |
| 2007/0194943 A1 | 8/2007 | Fitzer et al. |

OTHER PUBLICATIONS

European Search Report; European Patent Application No. 12797351.9; Nov. 27, 2014.

Notification of Substantive Examination; China Patent Application No. 201280027833.6; Jul. 11, 2014.

* cited by examiner

IMPACT INDICATOR

BACKGROUND

During manufacturing, storage or transit, many types of objects need to be monitored due to the sensitivity or fragility of the objects. For example, some types of objects may be susceptible to damage if dropped or a significant impact is received. Thus, for quality control purposes and/or the general monitoring of transportation conditions, it is desirable to determine and/or verify the environmental conditions to which the object has been exposed.

BRIEF SUMMARY

According to one aspect of the present disclosure, a device and technique for impact detection and indication is disclosed. The impact indicator includes a first member having a reservoir for holding an indicator fluid; a second member couplable to the first member; and a third member disposed between an opening of the reservoir and the second member. Responsive to receiving a predetermined level of impact, at least a portion of the indicator fluid exits the reservoir, and wherein the third member causes the portion of the indicator fluid to be distributed across a surface of the first member adjacent the opening and facing the third member, the portion of the indicator fluid located on the surface of the first member providing a visual indication of the received predetermined level of impact According to another embodiment of the present disclosure, an impact indicator includes a first member having a reservoir for holding an indicator fluid; a second member couplable to the first member; and a third member disposed at least partially between the first and second members. Responsive to receiving a predetermined level of impact, the indicator fluid moves from the reservoir to an interface formed by opposing surfaces of the first and third members located adjacent to the opening of the reservoir, the indicator fluid wicking into the interface to provide a visual indication of the received predetermined level of impact.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Embodiments of the present disclosure provide a device and technique for impact detection and indication. According to one embodiment, an impact indicator includes a first member having a reservoir for holding an indicator fluid; and a second member couplable to the first member over the reservoir and configured to form a capillary gap between at least a portion of an interface between the first and second members. Responsive to receiving a predetermined level of impact, the indicator fluid moves from the reservoir to the interface between the first and second members and wicks into the capillary gap via capillary action, the indicator fluid disposed within the capillary gap providing a visual indication of the received predetermined level of impact. Embodiments of the present disclosure enable impact and/or acceleration event detection utilizing a passive, small/compact indicator. Embodiments of the present disclosure also provide a relatively large indicating area for a visual indication of impact detection. Embodiments of the present disclosure further enable impact detection utilizing a relatively, thin, compact indicator design.

With reference now to the Figures and in particular with reference to FIGS. 1A, 1B, 2A and 2B, exemplary diagrams of an impact indicator 10 are provided in which illustrative embodiments of the present disclosure may be implemented. In FIGS. 1A, 1B, 2A and 2B, impact indicator 10 is a portable device configured to be affixed to or disposed within a transport container containing an object of which impact and/or acceleration events associated therewith are to be monitored. Embodiments of impact indicator 10 monitor whether an object has been exposed to an impact or some level of an acceleration event during manufacturing, storage and/or transport of the object. In some embodiments, impact indicator 10 may be affixed to a transport container using, for example, adhesive materials, permanent or temporary fasteners, or a variety of different types of attachment devices. The transport container may include a container in which a monitored object is loosely placed or may comprise a container of the monitored object itself. It should be appreciated that the above examples are only exemplary and are not intended to assert or imply any limitation with regard to the environments in which different embodiments of the impact indicator of the present disclosure may be implemented.

Figure 1A:
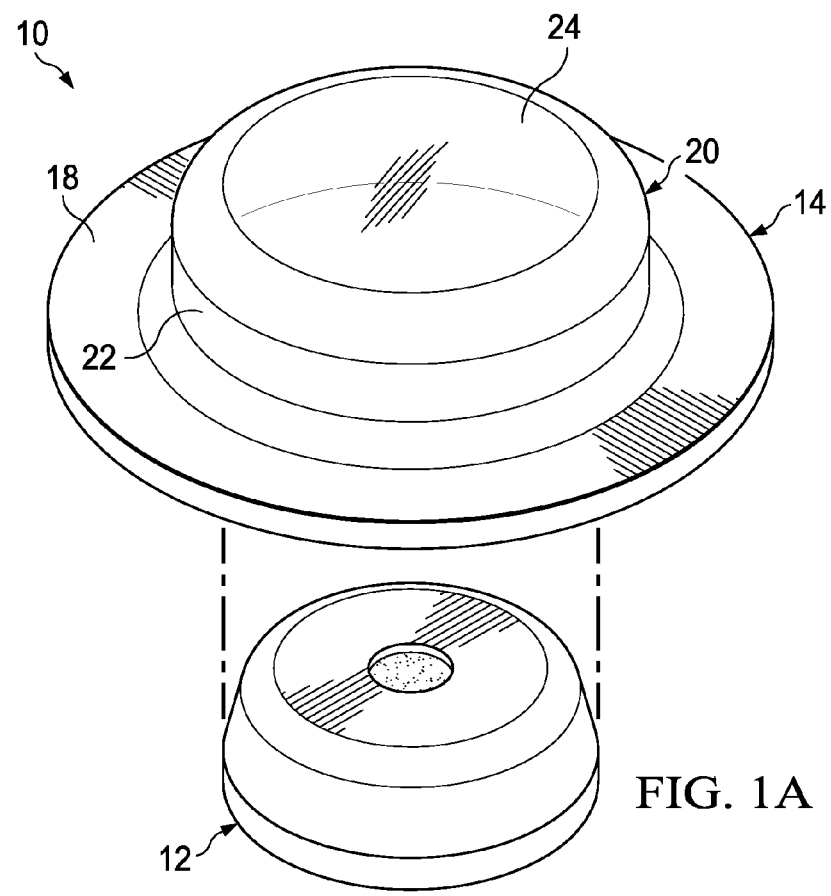
FIG. 1A is a diagram illustrating an exploded assembly view of an embodiment of an impact indicator according to the present disclosure.
Figure 1B:
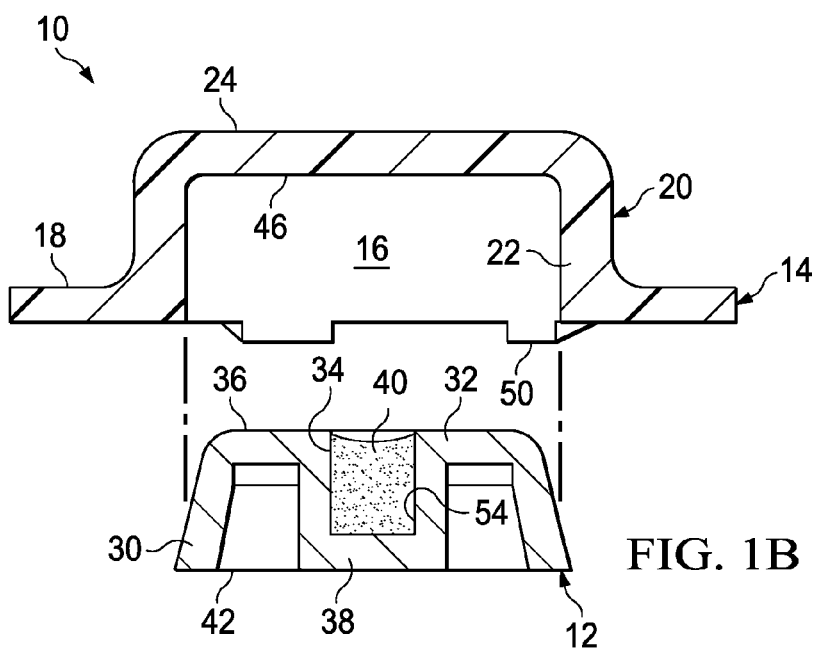
FIG. 1B is a diagram illustrating an exploded assembly section view of the impact indicator illustrated in FIG. 1A according to the present disclosure.
Figure 2A:
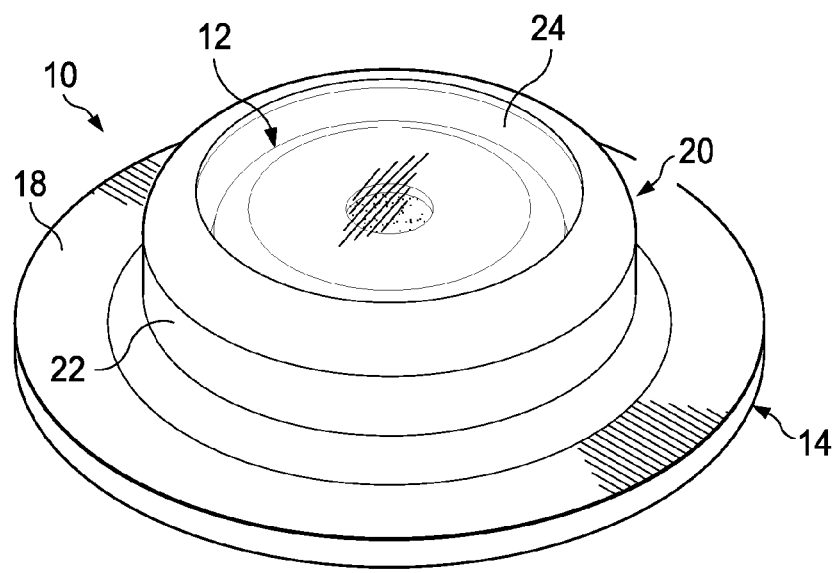
FIG. 2A is a diagram illustrating an assembled view of the impact indicator of FIGS. 1A and 1B according to the present disclosure.
Figure 2B:
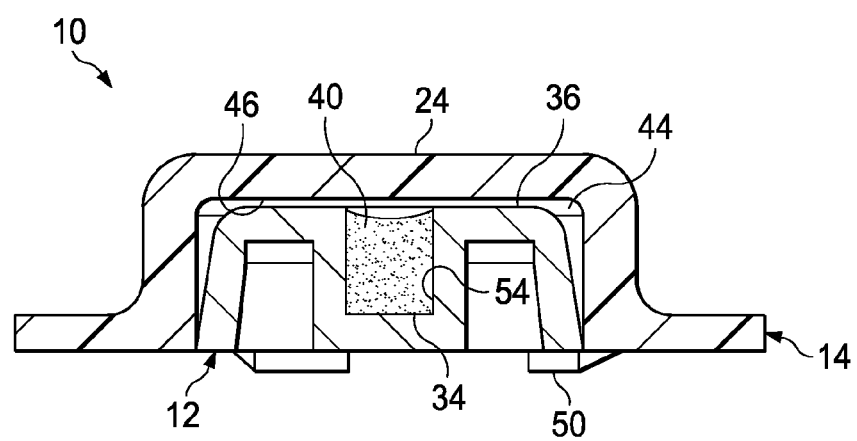
FIG. 2B is a diagram illustrating an assembled section view of the impact indicator illustrated in FIGS. 1A, 1B and 2A according to the present disclosure.

FIG. 1A is a diagram illustrating an exploded assembly view of impact indicator 10, and FIG. 1B is a diagram illustrating an exploded, sectioned assembly view of impact indicator 10 of FIG. 1A. FIG. 2A is a diagram illustrating an assembled view of impact indicator 10 of FIGS. 1A and 1B, and FIG. 2B is a diagram illustrating a sectioned assembled view of impact indicator 10 of FIGS. 1A, 1B and 2A. In the embodiment illustrated in FIGS. 1A, 1B, 2A and 2B, impact indicator 10 comprises a base member 12 and a cover member 14. Base member 12 is insertable into a cavity 16 formed in cover member 14. For example, in the illustrated embodiment, cover member 14 comprises a hat-shaped cover member 14 having an annular base 18 transitioning into a cylindrical body 20 having a vertical wall 22 and a closed top wall 24. Vertical wall 22 and top wall 24 form a cylindrically-shaped cavity 16 for receiving at least a portion of base member 12 therein. However, it should be understood that cover member 14 and/or cavity 16 may be of another shape (e.g., non-cylindrical). In some embodiments, cover member 14 and/or base member 12 may be constructed from a transparent, translucent and/or semi-opaque material to enable visibility therethrough. As will be described in greater detail below, in some embodiments, cover member 14 is constructed and/or otherwise formed to enable visibility therethrough (e.g., through top wall 24) of an indicator fluid that, if visible, is an indication that impact indicator 10 has been subjected to and/or otherwise experienced a predetermined level of impact or acceleration event. Although in some embodiments cover member 14 may be constructed as a single, unitary structure, it should be understood that cover member 14 may be formed from multiple components joined together. Further, it should be understood that various portions of cover member 14 may be opaque, masked, and/or otherwise configured while other portions of cover member 14 may be unmasked, clear, transparent, translucent and/or semi-opaque. For example, in some embodiments, base 18 and wall 22 may be opaque while top wall 24 is translucent.

Base member 12 comprises a sidewall 30, an upper wall 32 and a reservoir 34 extending downwardly from a surface 36 of upper wall 32 into a body portion 38 of base member 12. Reservoir 34 is formed for holding or containing therein an indicator fluid 40 that is used to provide an indication in response to impact indicator 10 being subjected to and/or otherwise experiencing a predetermined level of impact or acceleration event. Reservoir 34 may be cylindrical or non-cylindrical. Base member 12 is formed having a shape and/or configuration complementary to cavity 16 to enable at least a portion of base member 12 to be slidably inserted into cavity 16 of cover member 14. In some embodiments, sidewall 30 is formed having a tapered and/or angled wall configuration extending outwardly away from body portion 38 in a direction from surface 36 to surface 42 such that, upon insertion of base member 12 into cavity 16, sidewall 30 is slightly compressed inwardly toward body portion 38 from vertical wall 22 of cover member 14 to provide a compression seal between base number 12 and cover member 14 for preventing an escape of indicator fluid 40 from impact indicator 10. However, it should be understood that other methods and/or techniques may be used to provide a seal to prevent indicator fluid 40 from exiting impact indicator 10 (e.g., an o-ring, epoxy seal, or other type of sealing element or technique may be used between base member 12 and cover member 14).

In operation, base member 12 is inserted into cavity 16 of cover member 14 and forms a capillary gap at an interface between surface 36 of base member 12 and an interior surface 46 of the top wall 24 of cover member 14. In some embodiments, surface 36 is formed having a matted surface finish such that surface irregularities corresponding to the matted surface finish of surface 36 form capillary gap 44 between surface 36 and surface 46. For example, in some embodiments, when assembled, base member 12 is inserted into cavity 16 such that surface 36 is placed into contact with surface 46. The surface irregularities of surface 36 form capillary gap 44 between surface 36 and surface 46. It should also be understood that surface irregularities on surface 46 may also be utilized to form capillary gap 44. Additionally, it should be understood that in some embodiments, base member 12 may be secured to cover member 14 at a certain location or position to form capillary gap 44 of a desired size. For example, in some embodiments, cover member 14 and/or base member 12 may be formed with a lip, ridge, tab, or other element to position base member 12 relative to cover member 14 such that surface 36 is located at a desired distance from surface 46 to form capillary gap 44 of a desired size. However, it should be understood that other methods may be used to retain base member 12 at a certain position within cavity 16 to form capillary gap 44 of a desired dimension. In some embodiments, capillary gap 44 is sized to be between 0.001 and 0.005 inches; however, it should be understood that other sizes, greater or smaller, of capillary gap 44 may be used (e.g., based at least partly on a viscosity of indicator fluid 40, surface variations on surfaces 36 and 46, etc.).

In the embodiment illustrated in FIGS. 1B and 2B, cover member 14 includes a plurality of retention elements 50 that may be used to retain base member 12 within cavity 16 and coupled to cover member 14. For example, in some embodiments, retention elements 50 may be heat staked to extend over a portion of surface 42 of base member 12 to retain base number 12 in a fixed position within cavity 16. However, it should be understood that other types of devices and/or techniques may be used to fixedly couple base member 12 to cover member 14 (e.g., tabs, threaded assembly, snap-fit, etc.).

In some embodiments, indicator fluid 40 comprises a colored or dyed fluid to enable a visual indication that impact indicator 10 has been subjected to a predetermined level of impact or acceleration event. For example, in operation, indicator fluid 40 is held or retained in reservoir 34 by surface tension of indicator fluid 40. The indicator fluid 40 forms a meniscus with an interior wall surface 54 of reservoir 34. In response to receiving and/or experiencing a sufficient magnitude of impact or acceleration event, the meniscus contorts or ruptures, thereby causing at least a portion of indicator fluid 40 to splash or flow out of reservoir 40 toward surface 46 and/or capillary gap 44. Upon contact of indicator fluid 40 with surface 46 or indicator fluid 40 reaching an edge of the capillary gap 44 interface (e.g., near an edge or boundary of reservoir 34 with capillary gap 44), capillary gap 44 causes indicator fluid 42 wick into capillary gap 44 by capillary action (e.g., because of inter-molecular attractive forces between the fluid and solid surrounding surfaces) and substantially fill the interface between surfaces 36 and 46. As described above, in some embodiments, top wall 24 of cover member 14 is formed of a translucent or transparent material such that indicator fluid 40 is externally visible when residing within capillary gap 44 at the interface between surfaces 36 and 46, thereby providing a visual indication of an impact or acceleration event. In some embodiments, a mouth of reservoir 34 at or near surface 36 may be slightly drafted, rounded or angled to provide a defined path for indicator fluid 42 to wick into capillary gap 44 (e.g., at approximately one to four degrees or another suitable draft angle or shape).

The amount of surface tension of indicator fluid 40 to reservoir 34 can be controlled to result in a release of indicator fluid 40 (e.g., a distortion or rupture of a meniscus of indicator fluid 40 with surface 54) in response to a certain impact or acceleration level or magnitude. For example, a material of base member 12 (e.g., the material forming reservoir 34), the size or diameter of reservoir 34, and/or a viscosity of indicator fluid 40 may be selected to have a desired surface tension to reservoir 34, thereby needing a certain magnitude of impact or acceleration event to cause a distortion or disruption of the meniscus of indicator fluid 40 to cause indicator fluid 40 to wick into capillary gap 44 between surfaces 36 and 46. In some embodiments, indicator fluid 40 may comprise a mixture or combination of water, ethylene glycol, lithium chloride, and a desired colorant. The ethylene glycol functions to lower the freezing point of indicator fluid 40 for cold temperature applications. The lithium chloride functions to lower the vapor pressure of indicator fluid. However, it should be understood that other fluids or combinations of fluids may be used for indicator fluid 40. For example, as the bore size/diameter of reservoir 34 is reduced, a higher magnitude of acceleration is generally needed to rupture a meniscus corresponding to indicator fluid 40 in contact with surface 54 and release indicator fluid 40 toward capillary gap 44. For example, there are generally two factors that influence indicator fluid 40's response to acceleration—viscosity and surface tension. Viscosity influences a fluid's ability to quickly deform and change shape. Surface tension influences a fluid's affinity and adhesion to itself or an external surface. There is generally a finite range over which the viscosity of a fluid can be varied and significantly affect the activation or impact sensitivity. For example, in some embodiments, this range may be approximately between twenty centistokes and eighty centistokes, depending on the internal bore diameter of reservoir 34. However, it should be understood that other viscosities or viscosity ranges may be utilized based on a selected bore size of reservoir 34.

In some embodiments of the present disclosure, the following classes of fluids may also be utilized for indicator fluid 40: a) synthetic hydraulic fluids; b) silicone oils; and/or c) polypropylene glycol. These fluids promote higher impact sensitivities. For example, synthetic hydraulic fluids were originally developed as a non-flammable alternative to oil-based hydraulic fluid. Synthetic hydraulic fluids are available in various controlled viscosities. Many synthetic hydraulic fluids have a very high viscosity index. Viscosity index is a number that characterizes how the viscosity of a fluid changes due to temperature changes. Viscosity index is calculated from the measured viscosity at 40° C. and 100° C. using ASTM Method D 2270. Synthetic hydraulic fluids are stable and have moderately low freezing points.

Silicone oils (polymerized siloxanes) are generally considered not to be silicone but rather silicon analogues of carbon based organic compounds, and can form (relatively) long and complex molecules based on silicon rather than carbon. Chains are formed of alternating silicon-oxygen atoms ( . . . Si—O—Si—O—Si . . . ) or siloxane, rather than carbon atoms ( . . . C—C—C—C . . . ). Other species attach to the tetravalent silicon atoms, not to the divalent oxygen atoms which are fully committed to forming the siloxane chain. A typical example is polydimethylsiloxane, where two methyl groups attach to each silicon atom to form (H3C)[SiO(CH3)2]nSi(CH3)3. The carbon analogue would be an alkane (e.g. dimethylpropane C5H12 or (H3C)[C(CH3)2](CH3)). Silicone oils have an extremely high viscosity index and are available in controlled viscosities. Silicone oils are very inert, stable and have very low freezing points.

Polypropylene glycol or polypropylene oxide is generally considered to be the polymer of propylene glycol. Chemically, polypropylene glycol is a polyether. The term polypropylene glycol or PPG is reserved for a low to medium range molar mass polymer when the nature of the end-group, which is usually a hydroxyl group, affect polymer properties. The term "oxide" is used for a high molar mass polymer when end-groups no longer affect polymer properties. Polypropylene glycol is available in various molecular weights, which in turn provides for various viscosities. Polypropylene glycol also has a very low freezing point, is easily colored, and has a moderate viscosity index.

Thus, in some embodiments of the present disclosure, synthetic hydraulic fluids, silicone oils, and/or polypropylene glycol may be selected in various controlled viscosities for indicator fluid 40. Further, synthetic hydraulic fluids, silicone oils, and/or polypropylene glycol may also be blended to form indicator fluid 40 having a precise desired viscosity. Thus, embodiments of the present disclosure enable the selection and/or use of different particular viscosity fluids that may be used with a particular size of reservoir 34 to provide a variety of different impact sensitivities for impact indicator 10.

Figure 3A:
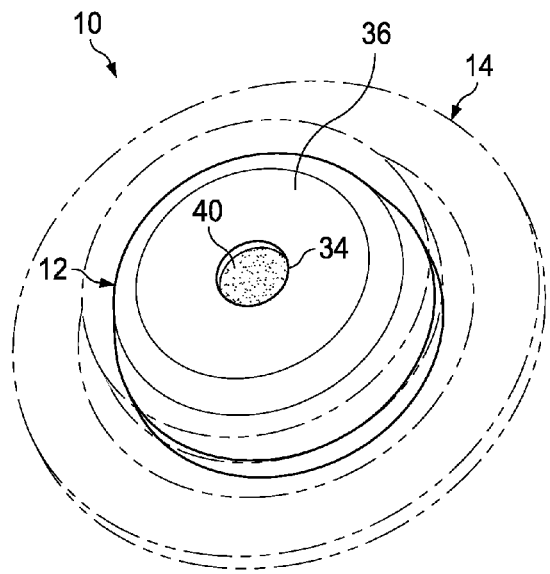
FIGS. 3A-3D are diagrams illustrating various stages of impact activation of the impact indicator illustrated in FIGS. 1A, 1B, 2A and 2B according to the present disclosure.
Figure 3B:
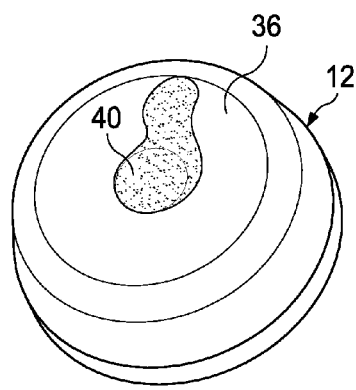
Figure 3C:
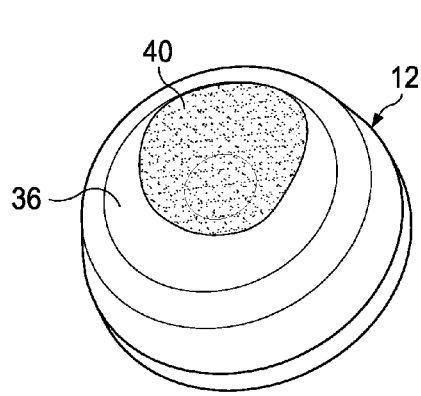
Figure 3D:
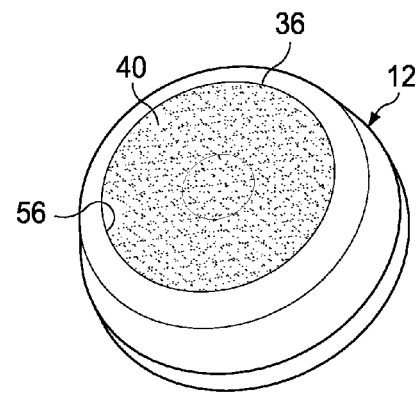

FIGS. 3A-3D are diagrams illustrating migration of indicator fluid 40 within capillary gap 44 by capillary action in response to impact indicator 10 being subjected to a sufficient magnitude of impact or acceleration event. Referring to FIG. 3A, impact indicator 10 is illustrated in a non-activated state (with cover member 14 depicted in phantom lines) such that indicator fluid 40 is located/retained within reservoir 34. For ease of description and clarity, impact indicator 10 is illustrated without cover member 14 in FIGS. 3B-3D; however, it should be understood that, in operation, cover member 14 would be coupled to base member 12 to form the capillary gap interface for impact indication. In FIG. 3B, in response to impact indicator 10 being subjected to a sufficient magnitude of impact or acceleration event, the meniscus of indicator fluid 40 with reservoir 34 is contorted or disrupted causing indicator fluid 40 to reach an interface common to capillary gap 44 and wick into and across capillary gap 44 by capillary action at the interface between surfaces 36 and 46. Referring to FIGS. 3C and 3D, the capillary action caused by capillary gap 44 causes indicator fluid 40 to wick into and fill (or substantially fill) the interface between surfaces 36 and 46 extending outwardly toward a peripheral boundary 56 of capillary gap 44. As described above, in some embodiments, top wall 24 of cover member 14 is formed of a transparent or translucent material such that the interface between surfaces 34 and 46 is externally visible, thereby enabling an external visual indication of impact indicator 10 activation by the visibility of indicator fluid 40 extending substantially across the interface between surfaces 36 and 46.

Figure 4A:
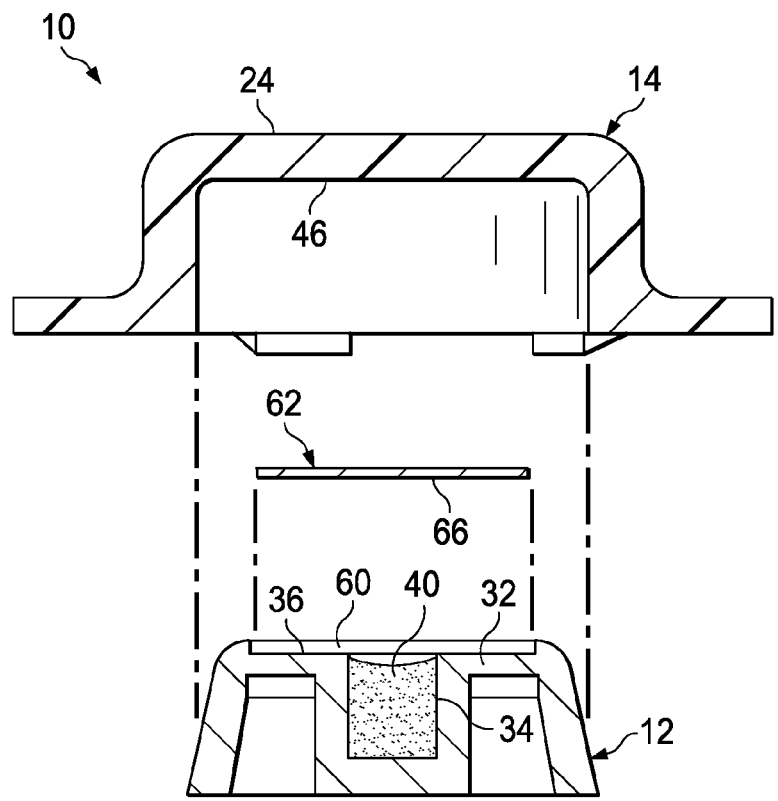
FIG. 4A is a diagram illustrating an exploded assembly section view of another embodiment of an impact indicator according to the present disclosure.
Figure 4B:
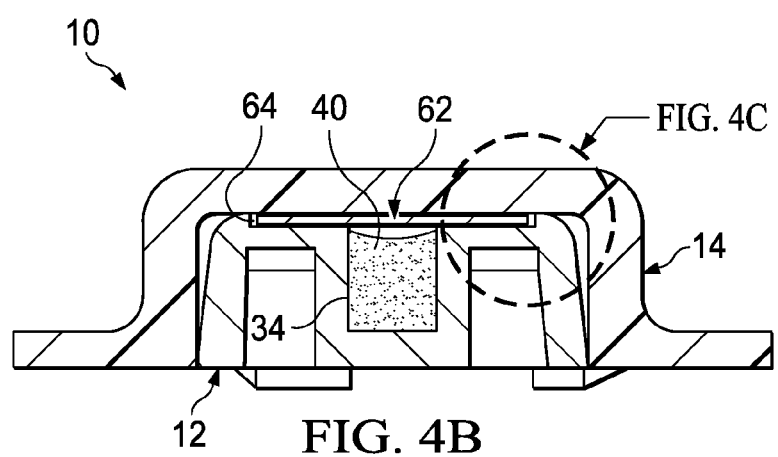
FIG. 4B is a diagram illustrating an assembled section view of the impact indicator illustrated in FIG. 4A according to the present disclosure.
Figure 4C:
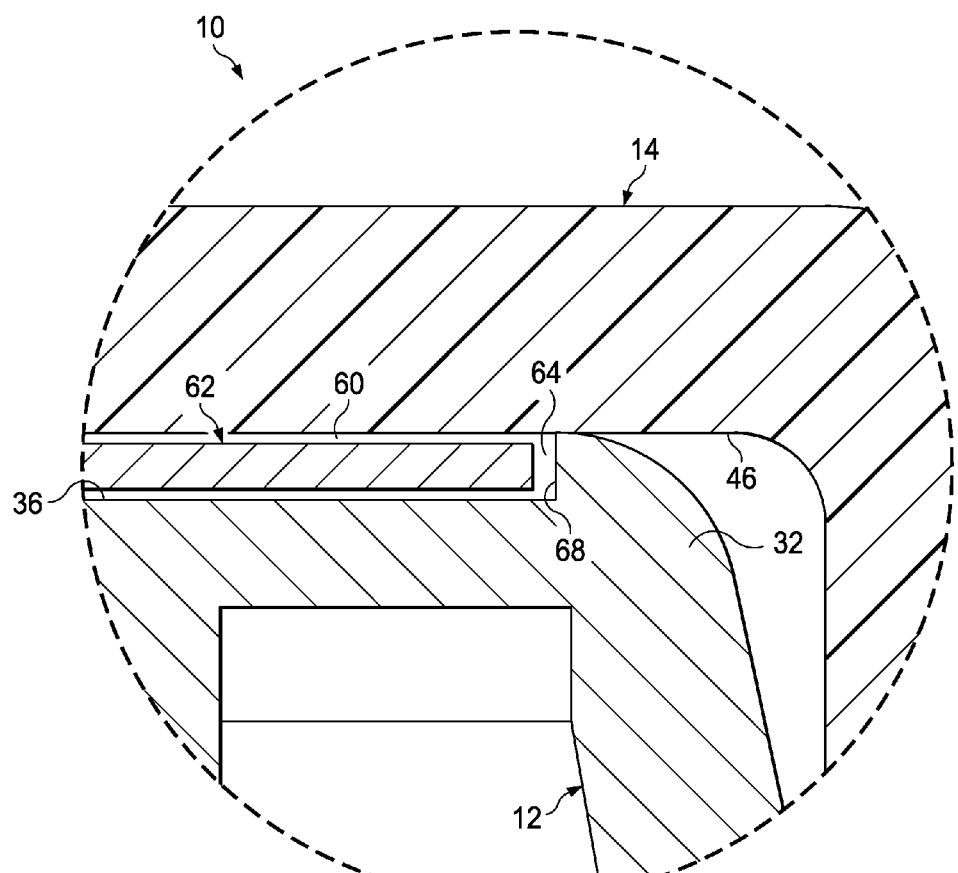
FIG. 4C is a diagram illustrating an enlarged view of a portion of the impact indicator illustrated in FIG. 4B according to the present disclosure.

FIGS. 4A-4C are diagrams illustrating another embodiment of impact indicator 10. In the illustrated embodiment, upper wall 32 of base member 12 is formed having a recess 60 for receiving a complementary-shaped disc member 62 therein. Recess 60 is formed to create a gap 64 between surface 36 of base member 12 and surface 46 of cover member 14 to enable disc member 62 to float within gap 64. In some embodiments, disc member 62 comprises a flexible material to enable disc member 62 to flexibly conform to surface 36 in response to indicator fluid 40 being located at the interface between surface 36 and a surface 66 of disc member 62. In some embodiments, disc member 62 may be constructed from plastic, polyester material (such as Mylar™ or Duralar™), cellophane or another type of flexible material to enable disc member 62 to conform (substantially evenly) to surface 36 in response to indicator fluid 40 wicking across the interface between surfaces 36 and 66. Referring to FIG. 4C, upper wall 32 may be formed having an elevated portion 68 that, when in contact with surface 46 of cover member 14, forms a desired size gap 64 for disc member 62, thereby creating a desired size capillary gap between disc member 62 and surface 36. However, it should be understood that other techniques or methods may be used to form a desired gap or cavity for retaining disc member 62 therein between surfaces 36 and 46 (e.g., a recess formed in top wall 24 of cover member 14).

In operation, in response to receipt of a sufficient magnitude of impact or acceleration event, indicator fluid 40 reaches the interface between disc member 62 and surface 36 and begins wicking across and/or into the capillary gap interface between surfaces 36 and 66 via capillary action. As a result of indicator fluid 40 wicking into the interface between surfaces 36 and 66, the capillary action of indicator fluid 40 pulls disc member 62 toward surface 36 and thereby evenly distributes (or substantially evenly distributes) indicator fluid 40 across the interface between surfaces 36 and 66. In some embodiments, disc member 62 may be formed from a translucent, transparent, semi-opaque or other material to enable indicator fluid 40 to be visible therethrough to provide a visual indication of activation of impact indicator 10.

Figure 5A:
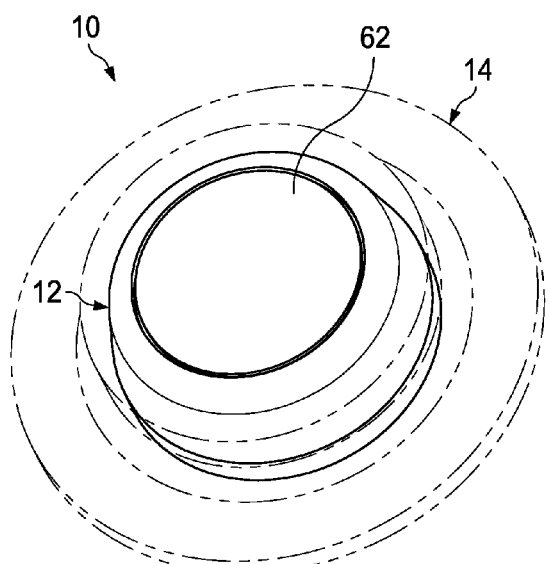
FIGS. 5A-5D are diagrams illustrating various stages of impact activation of the impact indicator illustrated in FIGS. 4A, 4B and 4C according to the present disclosure.
Figure 5B:
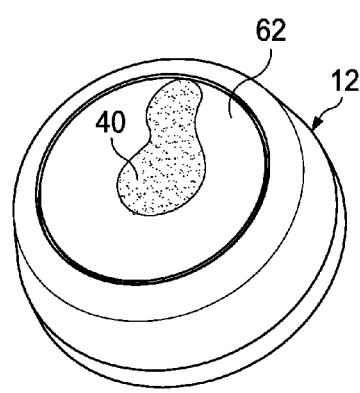
Figure 5C:
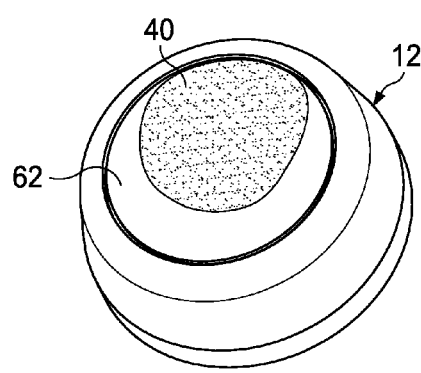
Figure 5D:
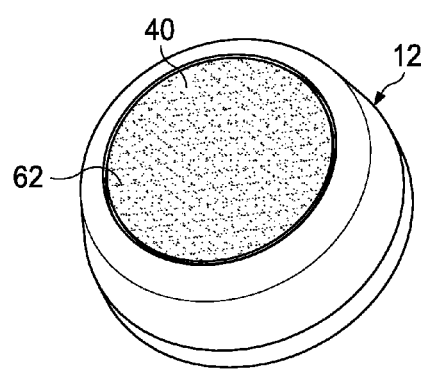

FIGS. 5A-5D are diagrams illustrating migration of indicator fluid 40 within the capillary gap interface formed between surface 36 and disc member 62 corresponding to the impact indicator 10 illustrated in FIGS. 4A-4C in response to impact indicator 10 being subjected to a sufficient magnitude of impact or acceleration event. Referring to FIG. 5A, impact indicator 10 is illustrated in a non-activated state (with cover member 14 depicted in phantom lines) such that indicator fluid 40 is located/retained within reservoir 34. In some embodiments, disc member 62 may prevent an external visual perception of indicator fluid 40 while retained in reservoir 34. For ease of description and clarity, impact indicator 10 is illustrated without cover member 14 in FIGS. 5B-5D; however, it should be understood that, in operation, cover member 14 would be coupled to base member 12 to retain disc member 62 within gap 64. In FIG. 5B, in response to impact indicator 10 being subjected to a sufficient magnitude of impact or acceleration event, the meniscus of indicator fluid 40 with reservoir 34 is contorted or disrupted causing indicator fluid 40 to reach the interface between surface 36 and surface 66 of disc member 62 and wick into and across the interface between surfaces 36 and 66 by capillary action. Referring to FIGS. 5C and 5D, the capillary action of indicator fluid 40 causes disc member 62 to flex downwardly slightly toward surface 36 to thereby cause indicator fluid 40 to wick into, fill and be dispersed across the interface between surfaces 36 and 66. As described above, in some embodiments, disc member 62 and top wall 24 of cover member 14 are formed of a translucent and/or transparent material such that the interface between surfaces 34 and 66 is externally visible, thereby enabling an external visual indication of impact indicator 10 activation by the visibility of indicator fluid 40 extending substantially across the interface between surfaces 36 and 66 toward a peripheral boundary of disc member 62 and/or gap 64.

Figure 6:
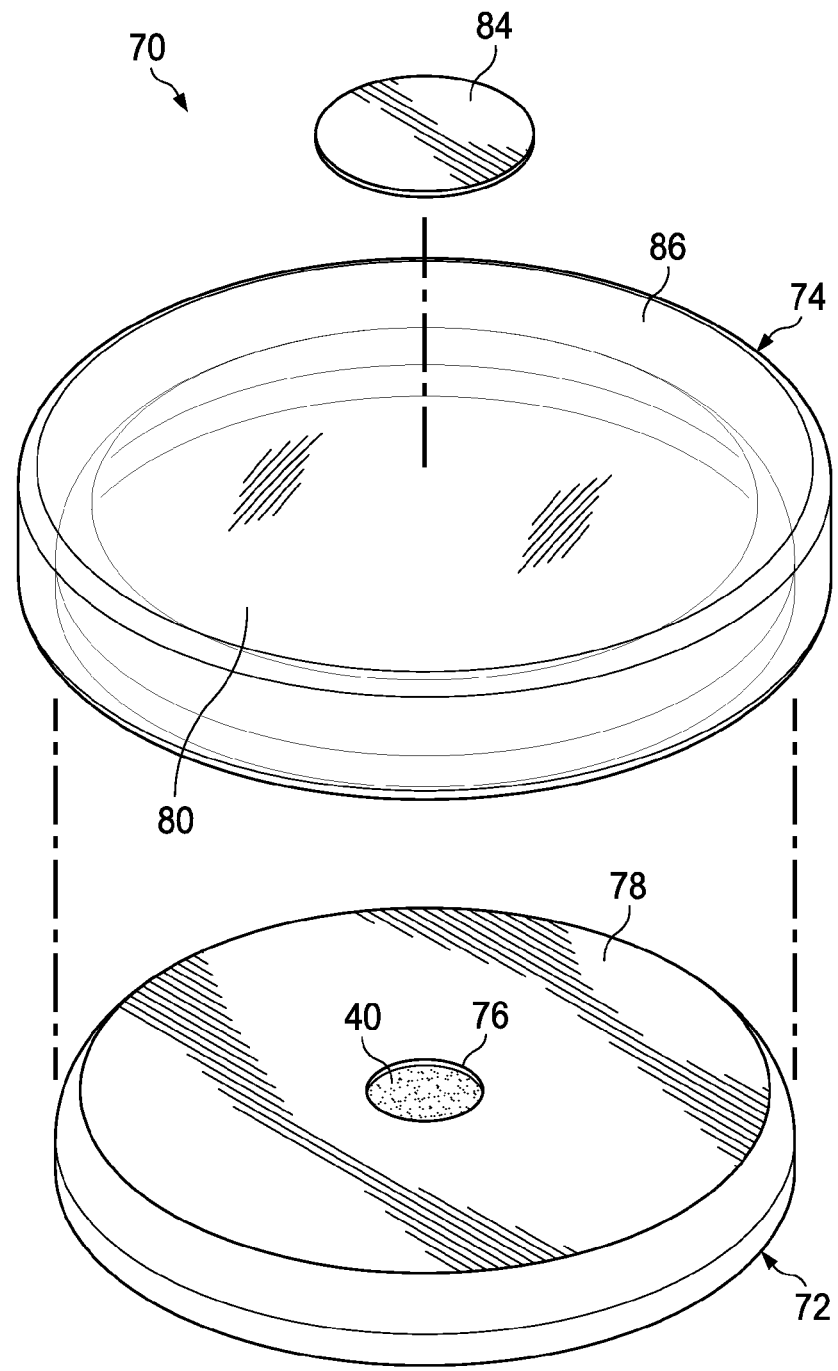
FIG. 6 is a diagram illustrating an exploded assembly view of another embodiment of an impact indicator according to the present disclosure.

FIG. 6 is a diagram illustrating another embodiment of an impact indicator 70 in accordance with the present disclosure. In the embodiment illustrated in FIG. 6, impact indicator 70 includes a base member 72 and a cover member 74. Base member 72 includes a reservoir 76 for retaining indicator fluid 40 therein. In the illustrated embodiment, cover member 74 is constructed from a transparent, translucent or semi-opaque material to enable visibility therethrough to detect indicator fluid 40 when located within a capillary gap interface formed between a surface 78 of base member 72 and an interior surface 80 of cover member 74 facing surface 78. In the embodiment illustrated in FIG. 6, a cover 84 is placed onto an exterior facing surface 86 of cover member 74 in a position corresponding to a location of reservoir 76. In some embodiments, cover 84 may comprise an adhesive-backed label or other type of cover element that may be adhered to surface 86 and/or otherwise affixed to cover member 74 to prevent visibility of indicator fluid 40 while located within reservoir 76.

As described above in connection with FIGS. 1A, 1B, 2A and 2B, cover member 74 is placed over and onto base member 72 and secured thereto such that surface 78 is brought into contact with and/or is otherwise placed in close proximity to interior surface 80 of cover member 74 to create a desired capillary gap between surfaces 78 and 80. In response to receiving a sufficient magnitude of impact or acceleration event, a meniscus of indicator fluid 40 with an interior surface or wall of reservoir 76 is distorted or disrupted causing a droplet or portion of indicator fluid 40 to contact surface 80 and/or otherwise come into contact with an edge of the interface formed between surfaces 78 and 80. The capillary gap formed between surfaces 78 and 80 cause indicator fluid 40 to wick into the capillary gap via capillary action and migrate across the interface formed between surfaces 78 and 80. As indicator fluid 40 wicks across the interface formed between surfaces 70 and 80, indicator fluid 40 extends beyond a boundary covered by cover 84 and becomes visible through surface 86 of cover member 74, thereby providing a visual indication of impact detection.

Figure 7A:
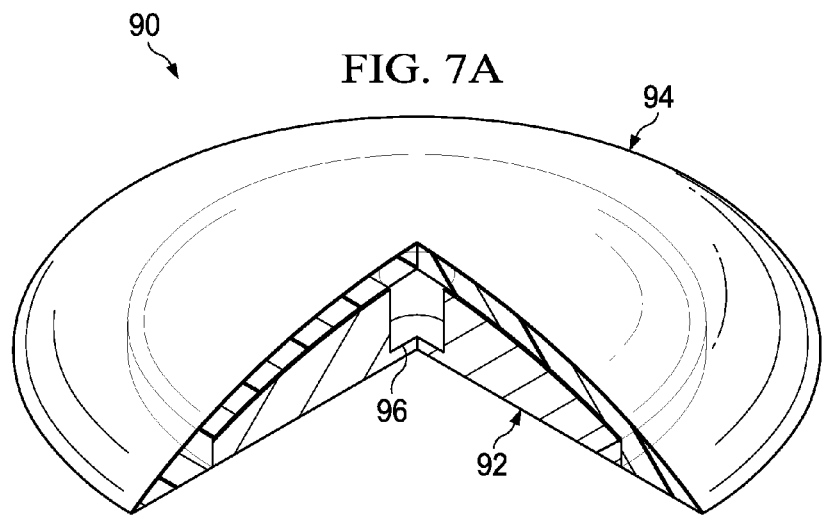
FIG. 7A is a diagram illustrating a perspective assembled view of another embodiment of an impact indicator according to the present disclosure.
Figure 7B:
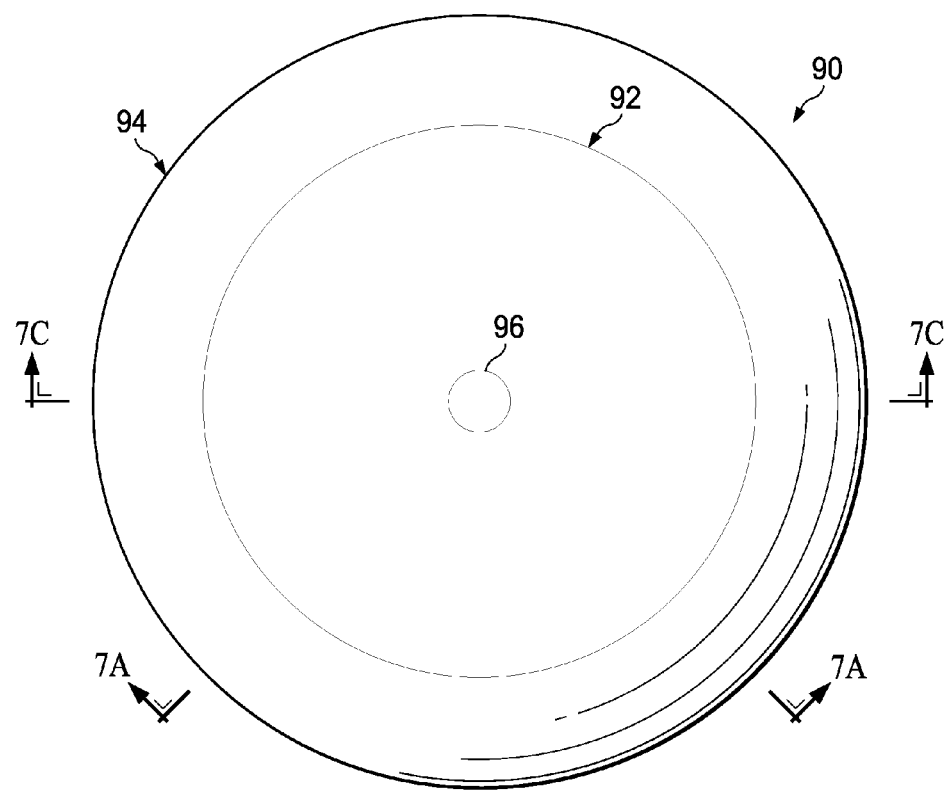
FIG. 7B is a diagram illustrating a top view of the impact indicator illustrated in FIG. 7A.
Figure 7C:
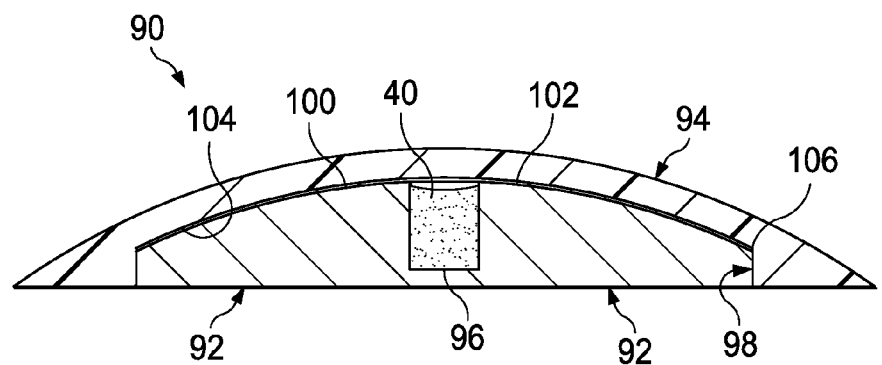
FIG. 7C is a diagram illustrating an assembled section view of the impact indicator illustrated in FIGS. 7A and 7B according to the present disclosure.

FIGS. 7A-7C are diagrams illustrating another embodiment of an impact indicator 90 in accordance with the present disclosure. FIG. 7A is a diagram illustrating a perspective view of impact indicator 90 partially sectioned (corresponding to line 7A-7A of FIG. 7B), and FIG. 7B is a diagram illustrating a top view (unsectioned) of impact indicator 90 illustrated in FIG. 7A. FIG. 7C is a diagram illustrating a section view of impact indicator 90 illustrated in FIGS. 7A and 7B taken along the line 7C-7C of FIG. 7B. In the embodiment illustrated in FIGS. 7A-7C, impact indicator 90 includes a base member 92 and a cover member 94. Base member 92 includes a reservoir 96 for retaining or holding therein indicator fluid 40. As described above, in some embodiments, cover member 94 is constructed from a transparent, translucent and/or semi-opaque material to enable at least partial visibility therethrough. Base member 92 and cover member 94 are constructed to facilitate insertion of base member 92 at least partially into and within a cavity 98 formed in cover member 94 to create a capillary gap interface 100 between a top surface 102 of base member 92 and an interior surface 104 of cover member 94. In the illustrated embodiment, surfaces 102 and 104 are arcuately formed having an arched or curved profile to provide a curved capillary gap interface 100. As described above in connection with FIGS. 1A, 1B, 2A and 2B, surfaces 102 and/or 104 may be formed having a matted surface or other surface finish creating irregularities in the respective surfaces to form capillary gap interface 100. Base member 92 and/or cover member 94 may also be constructed to secure base member 92 at a defined position within cavity 98 to define capillary gap interface 100 with a desired dimension (e.g., by using tabs, surface deviations, a raised edge for lip, etc.).

As described above, in response to being exposed to a sufficient magnitude of impact or acceleration even, a meniscus of indicator fluid 40 with reservoir 96 is distorted or ruptured causing at least a portion of indicator fluid 40 to contact surface 104 and/or otherwise come into contact with an edge of capillary gap interface 100. The size of capillary gap interface 100 causes indicator fluid 40 to wick into capillary gap interface 100 via capillary action. Indicator fluid 40 migrates into and extends outwardly away from reservoir 96 in capillary gap interface 100 toward an outward peripheral boundary 106 of capillary gap interface 100. As indicator fluid 40 wicks into and/or otherwise extends across or through capillary gap interface 100 toward boundary 106, indicator fluid 40 is visible through cover member 94, thereby providing a visual indication of impact detection.

Figure 8A:
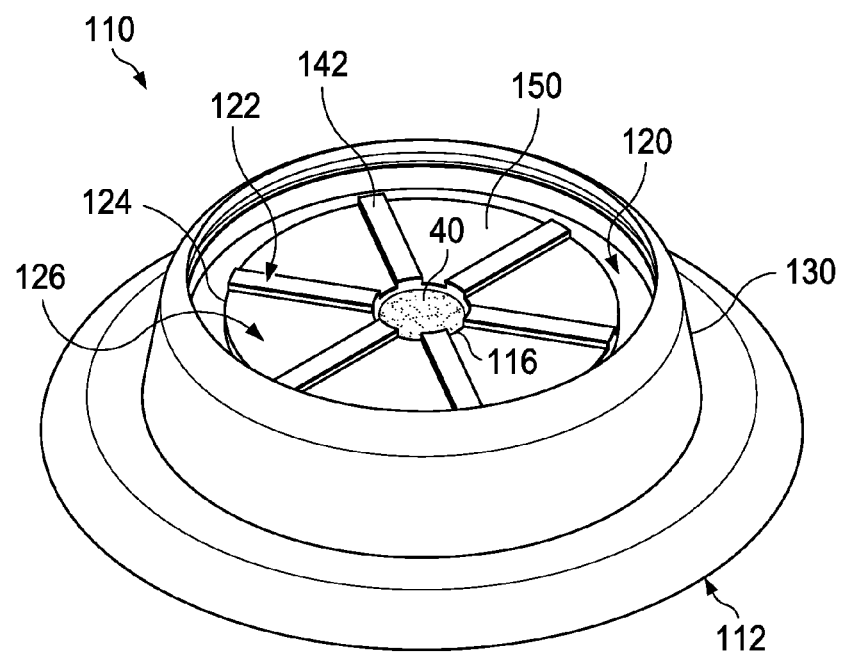
FIG. 8A is a diagram illustrating a perspective view of a base member of another embodiment of an impact indicator according to the present disclosure.
Figure 8B:
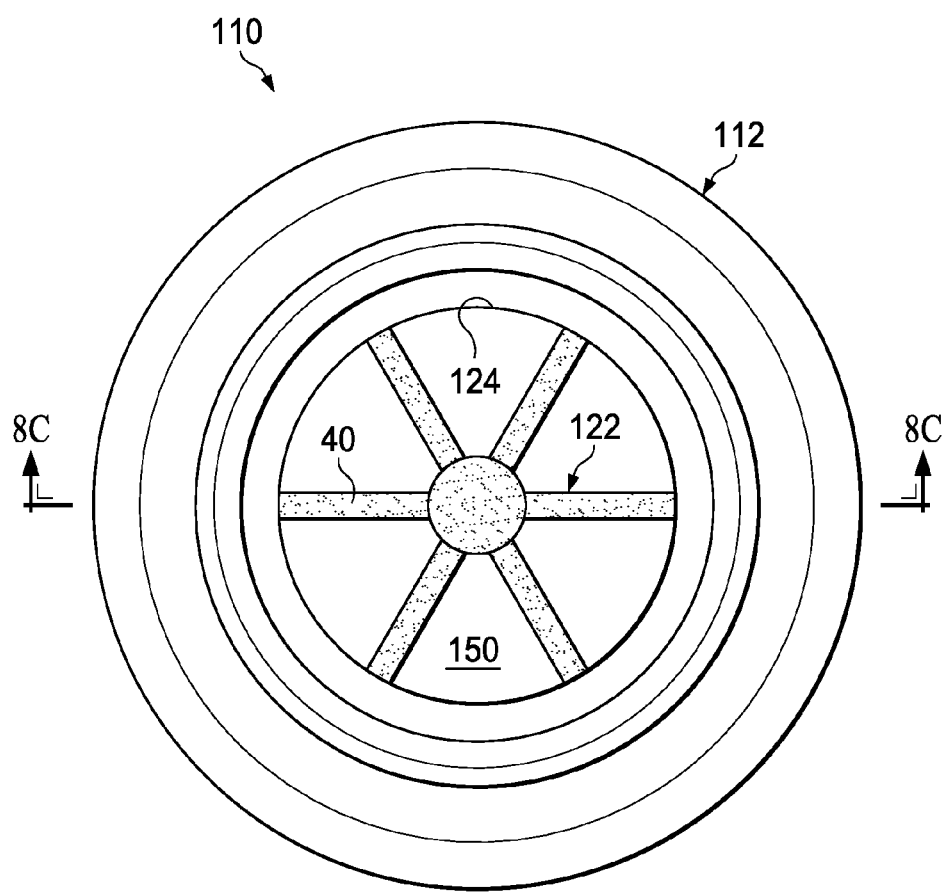
FIG. 8B is a diagram illustrating a top assembled view of the impact indicator illustrated in FIG. 8A.
Figure 8C:
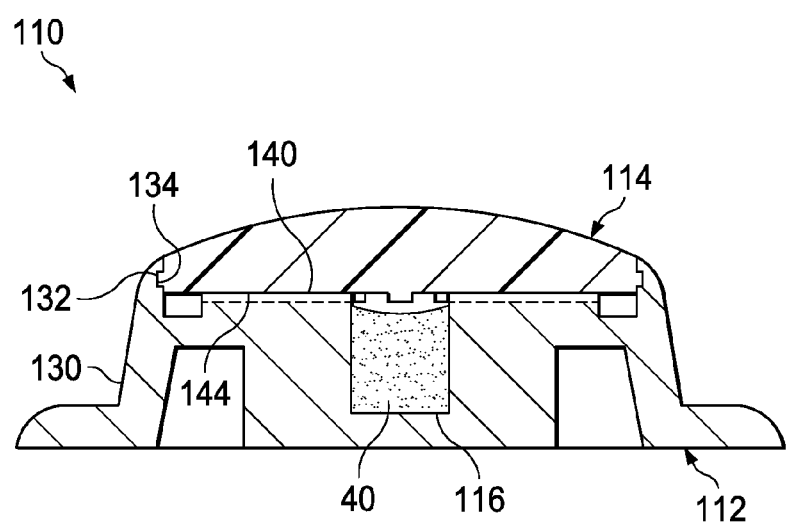
FIG. 8C is a diagram illustrating an assembled section view of the impact indicator illustrated in FIGS. 8A and 8B according to the present disclosure.

FIGS. 8A-8C are diagrams illustrating another embodiment of an impact indicator 110 in accordance with the present disclosure. FIG. 8A is a diagram illustrating an embodiment of a base member 112 of impact indicator 110. FIG. 8B is a diagram illustrating impact indicator 110 in an activated state. FIG. 8C is a diagram illustrating a section view of impact indicator 110 illustrated in FIGS. 8B taken along the line 8C-8C of FIG. 8B. In the embodiment illustrated in FIGS. 8A-8C, impact indicator 110 includes base member 112 and a cover member 114. Base member 112 includes a reservoir 116 for retaining or holding therein indicator fluid 40. As described above, in some embodiments, cover member 114 is constructed from a transparent, translucent and/or semi-opaque material to enable at least partial visibility therethrough.

In the illustrated embodiment, base member 112 is formed having a cavity 120 formed in an upwardly facing direction for receiving insertion therein of cover member 114. Base member 112 also includes rib members 122 extending radially outward from reservoir 116 toward an outward peripheral boundary 124 of an upwardly facing pedestal portion 126 of base member 112. A sidewall 130 of base member 112 is formed with an annular recess 132 for receiving therein an annular tab 134 formed on cover member 114 to facilitate a snap-fit coupling of cover member 114 to base member 112 within cavity 120. However, it should be understood that other methods or techniques may be used to secure cover member 114 to base member 112.

Base member 112 and cover member 114 are constructed to facilitate insertion of cover member 114 at least partially into and within cavity 120 of base member 112 and extending over reservoir 116 such that a capillary gap interface 140 is formed between a top surface 142 of rib members 122 and an interior surface 144 of cover member 114. As described above in connection with FIGS. 1A, 1B, 2A and 2B, surfaces 142 and/or 144 may be formed having a matted surface or other surface finish creating irregularities in the respective surfaces to form capillary gap interface 140. The location of recess 132 and tab 134 may also be configured to secure cover member 114 at a defined position within cavity 120 to define capillary gap interface 140 with a desired dimension.

As described above, in response to being exposed to a sufficient magnitude of impact or acceleration even, a meniscus of indicator fluid 40 with reservoir 116 is distorted or ruptured causing at least a portion of indicator fluid 40 to contact surface 144 and/or otherwise come into contact with an edge of capillary gap interface 140. The size of capillary gap interface 140 causes indicator fluid 40 to wick into capillary gap interface 140 via capillary action. Indicator fluid 40 migrates into and extends outwardly away from reservoir 116 in capillary gap interface 140 toward boundary 124 of capillary gap interface 140. In the event indicator fluid 40 enters spaced areas 150 located between rib members 122, the capillary action caused by capillary gap 140 will cause the indicator fluid 40 to be wicked out of such spaced areas 150 into the capillary gap 140 areas common to surfaces 142 of rib members 122. As indicator fluid 40 wicks into and/or otherwise extends across or through capillary gap interface 140 toward boundary 124, indicator fluid 40 is visible through cover member 114, thereby providing a visual indication of impact detection.

Thus, embodiments of the present disclosure enable impact and/or acceleration event detection utilizing a passive, small/compact indicator. Embodiments of the present disclosure provide a relatively large indicating area for a visual indication of impact detection. Embodiments of the present disclosure also enable impact detection utilizing a relatively, thin, compact indicator design. Embodiments of the present invention also enable omnidirectional impact or acceleration event detection and indication (e.g., impact or acceleration events in a number of different directions, including directional component vector directions). For example, impact or acceleration events may be detected in directions parallel to or axially aligned with an axis or longitudinal direction of reservoir 34 (e.g., perpendicular to surface 36), directions perpendicular or radially normal to an axis or longitudinal direction of reservoir 34 (e.g., in a direction parallel to a plane of surface 36) and in other directions based on directional vector component magnitudes.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An impact indicator, comprising:
a first member having a reservoir for holding an indicator fluid;
a second member couplable to the first member; and
a third member disposed between an opening of the reservoir and the second member; and
wherein, responsive to receiving a predetermined level of impact, at least a portion of the indicator fluid exits the reservoir, and wherein the third member causes the portion of the indicator fluid to be distributed across a surface of the first member adjacent the opening and facing the third member, the portion of the indicator fluid located on the surface of the first member providing a visual indication of the received predetermined level of impact.

2. The impact indicator of claim 1, wherein the indicator fluid comprises a synthetic hydraulic fluid.

3. The impact indicator of claim 1, wherein the indicator fluid comprises a silicone oil fluid.

4. The impact indicator of claim 1, wherein the indicator fluid comprises a propylene glycol fluid.

5. The impact indicator of claim 1, wherein an internal bore size of the reservoir and a viscosity of the indicator fluid are selected to obtain a desired activation sensitivity for the predetermined level of impact.

6. The impact indicator of claim 1, wherein the third member comprises a flexible member.

7. The impact indicator of claim 1, wherein the second member comprises a material enabling visibility of the indicator fluid when located on the surface of the first member.

8. The impact indicator of claim 1, wherein the viscosity of the indicator fluid is between 20 and 80 centistokes.

9. The impact indicator of claim 1, wherein the third member comprises a material enabling visibility of the indicator fluid when located on the surface of the first member.

10. An impact indicator, comprising:
a first member having a reservoir for holding an indicator fluid;
a second member couplable to the first member; and
a third member disposed at least partially between the first and second members; and
wherein, responsive to receiving a predetermined level of impact, the indicator fluid moves from the reservoir to an interface formed by opposing surfaces of the first and third members located adjacent to the opening of the reservoir, the indicator fluid wicking into the interface to provide a visual indication of the received predetermined level of impact.

11. The impact indicator of claim 10, wherein the second member comprises a material enabling visibility of the indicator fluid when the indicator fluid is within the interface.

12. The impact indicator of claim 10, wherein the indicator fluid comprises at least one of a synthetic hydraulic fluid, a silicone oil fluid and propylene glycol fluid.

13. The impact indicator of claim 10, wherein a diameter of the reservoir and a viscosity of the indicator fluid are selected to obtain a desired activation sensitivity for the predetermined level of impact.

14. The impact indicator of claim 10, wherein the viscosity of the indicator fluid is between 20 and 80 centistokes.

15. The impact indicator of claim 10, wherein, responsive to the indictor fluid entering the interface, the indicator fluid migrates toward a peripheral boundary of the interface.

16. The impact indicator of claim 15, wherein the indicator fluid migrates in at least two different directions from the opening toward the peripheral boundary of the interface.

17. The impact indicator of claim 10, wherein the third member comprises a material enabling visibility of the indicator fluid when located in the interface.

* * * * *